United States Patent [19]

Ban et al.

[11] 4,318,438
[45] Mar. 9, 1982

[54] METHOD FOR CASTING A FIBER-REINFORCED COMPOSITE ARTICLE

[75] Inventors: Keisuke Ban, Fujimi; Takeo Arai, Tokyo, both of Japan

[73] Assignee: Honda Giken Kogyo Kabushiki Kaisha, Tokyo, Japan

[21] Appl. No.: 837,148

[22] Filed: Sep. 27, 1977

[51] Int. Cl.³ .................... B22D 18/02; B22D 19/14
[52] U.S. Cl. .................................. 164/97; 164/100; 164/120
[58] Field of Search .............. 164/97, 111, 75, 100, 164/120; 228/173 R

[56] References Cited

U.S. PATENT DOCUMENTS

| | | | |
|---|---|---|---|
| 3,480,465 | 11/1969 | Imabayashi et al. | 164/75 X |
| 3,547,180 | 12/1970 | Cochran et al. | 164/97 X |
| 3,792,726 | 2/1974 | Sakai et al. | 164/120 X |
| 3,841,386 | 10/1974 | Niimi et al. | 164/100 X |
| 3,888,296 | 6/1975 | Vernia et al. | 164/97 |

FOREIGN PATENT DOCUMENTS

| | | | |
|---|---|---|---|
| 47-30492 | 8/1972 | Japan | 164/111 |
| 940888 | 11/1963 | United Kingdom | 228/173 R |

Primary Examiner—Robert D. Baldwin
Attorney, Agent, or Firm—Armstrong, Nikaido, Marmelstein & Kubovcik

[57] ABSTRACT

Disclosed in this specification is a method for casting, in which a shaped body of an inorganic fiber material is fixedly secured on a chill member, then the chill member together with the shaped body of inorganic fiber is incorporated in a predetermined part of a cast article through a fiber-reinforced composite layer to be brought about at the time of casting under high pressure solidification casting techniques.

14 Claims, 4 Drawing Figures

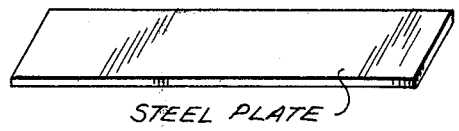
FIG.4a
STEEL PLATE
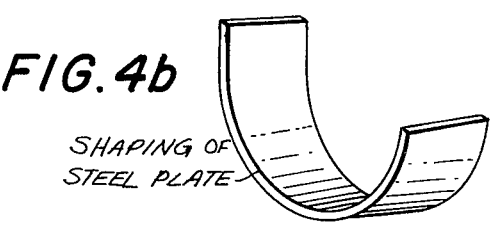
FIG.4b
SHAPING OF STEEL PLATE
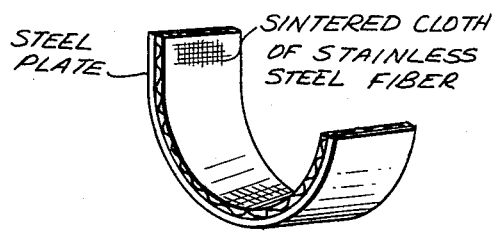
STEEL PLATE
SINTERED CLOTH OF STAINLESS STEEL FIBER
FIG.4c
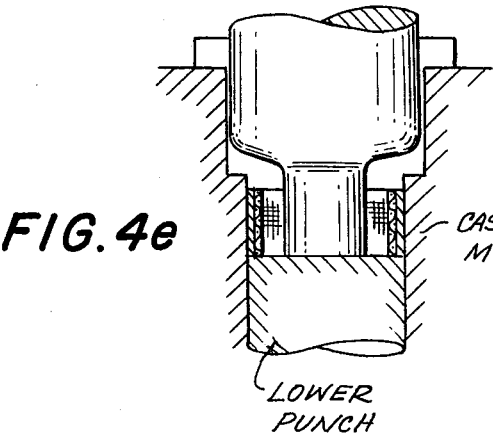
FIG.4e
CASTING MOLD
LOWER PUNCH
FIG.4d
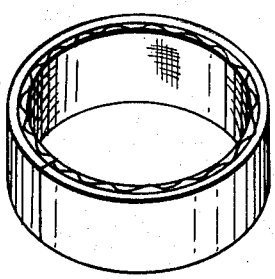
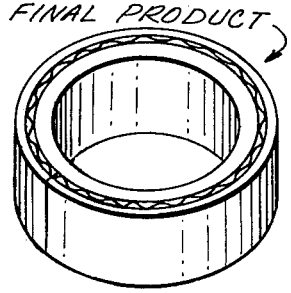
FINAL PRODUCT
FIG.4f

METHOD FOR CASTING A FIBER-REINFORCED COMPOSITE ARTICLE

BACKGROUND OF THE INVENTION (a) Field of the Invention

This invention relates to a casting method, and, more particularly, to a method of casting that is particularly suitable for incorporating other casting component into a cast article.

(b) Prior Art

So called internal chill techniques have heretofore been practiced to incorporate into a predetermined part of a cast article other component members in accordance with the purpose of use of the cast article. For these internal chill techniques, there have been known mechanical internal chill methods, in which the component to be incorporated is simply held in the cast article by a mechanical expedient, and in other internal chill technique in which diffusion reaction is accompanied by various kinds of treatment. In either of these cases, the process requires many steps and has high cost of treatment, despite which the resulting cast article does not have sufficient mechanical strength and its range of use is considerably limited. For example, in the case of an aluminum alloy casting, various ferrous materials which have been subjected to a plating process with molten aluminum (the so-called "aluminizing treatment") have been utilized as the internal chill member. This internal chill member, however, is low in its adhesive strength to a matrix metal alloy; hence, in many cases, mechanical means for joining both together has been resorted to in general. Furthermore, this internal chill member brings about serious problems in its thermal expansion difference and its use in hot conditions with respect to aluminum alloy having a heat-treatable property. In addition, the combination of these two metal materials requires complicated process steps, and hence is inferior in its productivity in an industrialized large scale while being costly in its manufacture.

On the other hand, with increasingly wide use of ceramic materials in many fields of industry, there have been increasing demands toward the internal chill joining of this material making best use of its physical characteristics. At the present circumstances, however, there is no effective method for incorporating other component member to the ceramic material other than the mechanical internal chill method, and hence its range of use is limited as is the case with the above-mentioned aluminum alloy casting.

SUMMARY OF THE INVENTION

It is therefore a primary object of the present invention to remove various disadvantages inherent in the abovementioned conventional internal chilling method, and to obtain strong and tight internal chilling of a component member in the cast article without subjecting the internal chill member to any particular and complicated treatment processes.

According to the present invention, generally speaking, there is provided a method for casting which comprises fixedly securing a shaped body of an inorganic fiber material on a chill member, and then incorporating the chill member together with the shaped body of inorganic fiber in a predetermined part of a cast article through a fiber-reinforced composite layer to be brought about at the time of casting under a high pressure solidification casting technique.

There has thus been outlined rather broadly, the more important features of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions so far as they do not depart from the spirit and scope of the present invention.

BRIEF DESCRIPTION OF THE DRAWING

FIGS. 4a-4f show the sequence of stages in the formation of a bearing following the procedure in Example 6.

DETAILED DESCRIPTION OF THE PREFERRED EMBODIMENTS

For the abovementioned internal chill member, there may be used various kinds of metal plates or shaped bodies obtained from such metal plates. In some cases, planar ceramic body or shaped bodies obtained from such ceramic material may be used.

For the inorganic fiber materials, there may be used various kinds of metal fibers, non-metallic ceramic fibers, and so forth. These fiber materials are used in the form of a felt or any other shape of arbitrary configurations. Bulk density of these shaped fiber bodies is controllable depending on the purpose and use of such shaped bodies. Usually, a bulk density range of from 0.05 g/cc to 1.0 g/cc or so is appropriate.

The abovementioned chill member and the shaped fiber body are fixedly secured together by spot-welding or seam-welding in the case when both component members are metallic, while they are tightly joined together by adhesion, fusion-bonding, and the like in the course of the calcining step when both component members are made of ceramic material.

In order to improve the tight combination between the cast alloy matrix, the chill member, and the inorganic fiber shaped body, it is preferable that the abovementioned chill member be subjected to a treatment such as, for example, a plating treatment with molten aluminum, and that the inorganic fiber material be subjected to a metal coating treatment.

The technique of obtaining a fiber-reinforced composite member by filling and combining a shaped body made of various kinds of fiber material in and with the alloy matrix of a cast article under the high pressure solidification casting method has been developed which is disclosed in a commonly assigned copending United States patent application Ser. No. 725,990 filed Sept. 23, 1976 and abandoned in favor of Ser. No. 914,297, and hence reference may be had to this prior application for further details of the technique.

In order to enable skilled persons in the art to reduce the present invention into practice, the following preferred examples are presented. It should, however, be borne in mind that these examples are merely illustrative and not restrictive and any changes and modifications may be made without departing from the spirit and scope of the present invention as set forth in the appended claims.

EXAMPLE 1

MANUFACTURE OF A PISTON FOR A 4-CYCLE ENGINE HAVING A BORE OF 74 MM

Figure 1A:
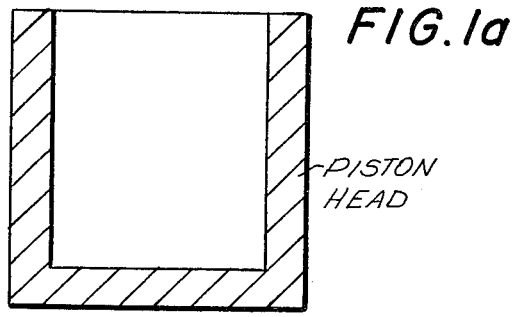
FIGS. 1a-1d show the sequence of stages in the formation of a piston following the procedure in Example 1.
Figure 1B:
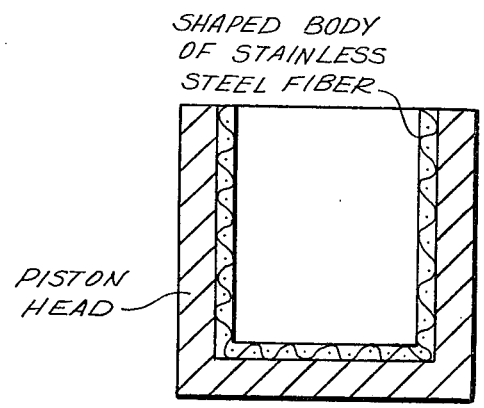
Figure 1C:
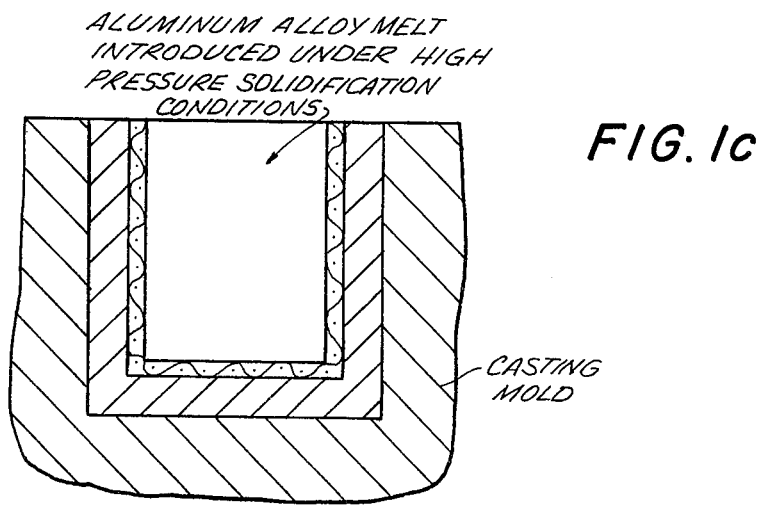
Figure 1D:
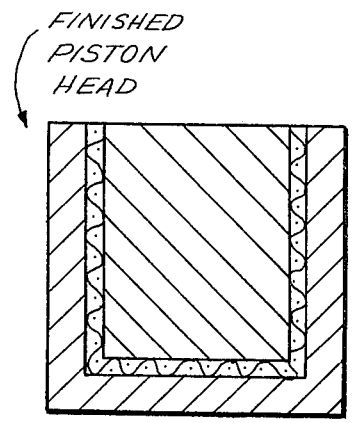

By the use of a stainless steel plate of 0.8 mm thick ("SUS27" in accordance with the Japanese Industrial Standard), a piston head (FIG. 1a) was shaped by a press machine to form a chill member. Then, a shaped fiber body in felt form having a bulk density of 0.15 g/cc and a thickness of 5 mm obtained by the use of stainless steel fiber was fixedly secured to the entire inner surface of the piston head (FIG. 1b) by spot welding and seam welding. Subsequently, as shown in FIG. 1c, the now formed chill member and shaped fiber body are placed in a casting mold, into which aluminum alloy melt ("AC8B" in accordance with the Japanese Industrial Standard) was poured and solidified under the high pressure solidification casting method, thereby casting the piston (FIG. 1d).

This piston was of such a structure that the outer surface of the head was made of the stainless steel plate, beneath which a fiber-reinforced composite layer integrally combined with the head surface material is present. When this piston was subjected to the engine test, it was discovered that there had occurred no functional defects such as exfoliation of the chill member from the matrix alloy, breakage of the piston head, and so forth. In this consequence, the heat-resistance and the heat insulating effect of the piston head became remarkable, and improvement in the thermal efficiency of the engine became possible.

EXAMPLE 2.

Using the same chill member and shaped fiber body as in Example 1 above, another piston was cast under the high pressure solidification casting method with magnesium alloy ("AZ63 Series" in accordance with the Japanese Industrial Standard) as the matrix. The thus obtained piston was light in weight. When the piston was subjected to the engine test in the same manner as in Example 1 above, it was found out that the test results were satisfactory.

EXAMPLE 3

MANUFACTURE OF A CYLINDER HEAD FOR INTERNAL COMBUSTION ENGINE HAVING A BORE OF 74 MM

Figure 2A:
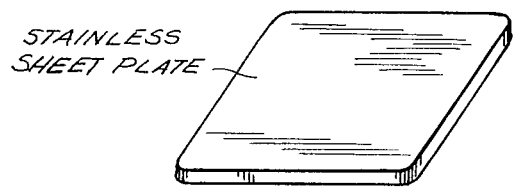
FIGS. 2a-2e show the sequence of stages in the formation of a cylinder head following the procedure in Example 3.
Figure 2B:
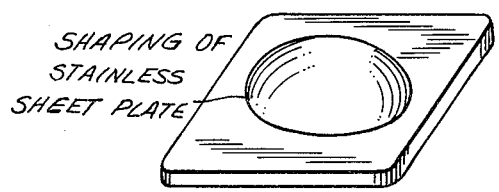
Figure 2C:
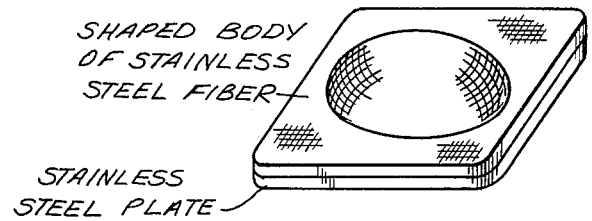
Figure 2D:
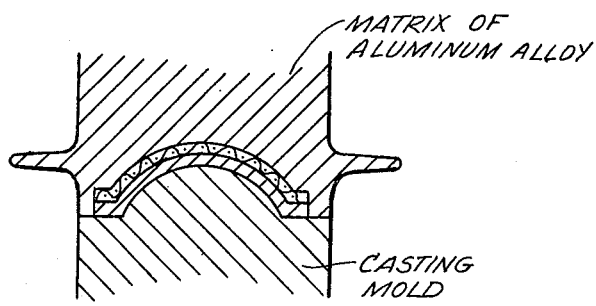
Figure 2E:
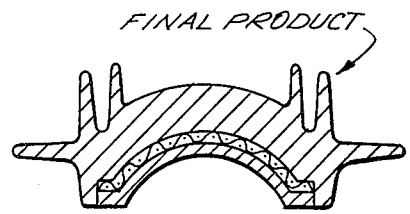

Stainless steel plate (FIG. 2a) same as that used in Example 1 above was shaped in the form of a combustion chamber of an internal combustion engine by means of a press machine to form a chill member (FIG. 2b). Then, onto the entire outer surface of the press-formed article, there was fixed a shaped fiber body which was obtained by plain weaving of stainless steel fiber of 12 microns in diameter by the spot welding and seam welding (FIG. 2c). Subsequently, the above-mentioned chill member and shaped fiber body were placed in a casting mold, onto which aluminum alloy ("AC2B" in accordance with the Japanese Industrial Standard) as the matrix was poured and solidified under the high pressure solidification casting method (FIG. 2d), thereby obtaining the base material for the combustion chamber. This base material was further treated by the gravity casting method to thereby obtain the desired cylinder head.

When the engine test was conducted by using the abovementioned cylinder head and the piston of Example 1 above in combination, there could be ascertained more improvement in the heat insulating effect and thermal efficiency in the engine.

EXAMPLE IV

MANUFACTURE OF PISTON FOR AN AIR-COOLED 2-CYCLE ENGINE HAVING A BORE OF 70 MM

A piston head constituting a chill member was shaped by means of a press machine from a steel plate of 0.6 mm thick which has been subjected to a plating treatment with molten aluminum. Then, a shaped fiber body in felt form having a bulk density of 0.30 g/cc and a thickness of 3 mm obtained from stainless steel fiber of 10 microns in diameter was fixedly secured on the entire inner surface of the piston head by the spot welding and seam welding to from a chill member. Subsequently, the now formed chill member and the shaped body were placed in a casting mold, onto which an alloy of excess-eutectic silicon and aluminum as the matrix was poured and solidified under the high pressure solidification casting method, whereby the desired piston was obtained.

This piston was of such a structure that its outer surface consists of the steel plate which had been plate-treated with molten aluminum, beneath which a fiber-reinforced composite layer integrally combined with the steel plate was present. When the thus obtained piston was subjected to the engine test same as in Example 1 above, it was found out that there occurred no exfoliation of the chill member from the matrix metal, breakage of the piston and other functional defects whatsoever. The piston was also found to have been superior in its heat-resistance and blow-off resistance. Further, when the chill member is incorporated in only one part of the head, the piston exhibited satisfactory blow-off resistance.

EXAMPLE 5

MANUFACTURE OF A CONNECTING ROD FOR INTERNAL COMBUSTION ENGINE

Figure 3A:
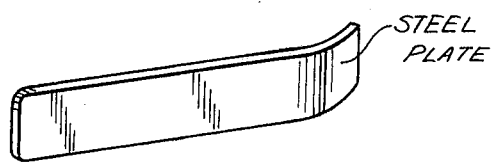
FIGS. 3a-3d show the sequence of stages in the formation of a connecting rod following the procedure in Example 5.
Figure 3B:
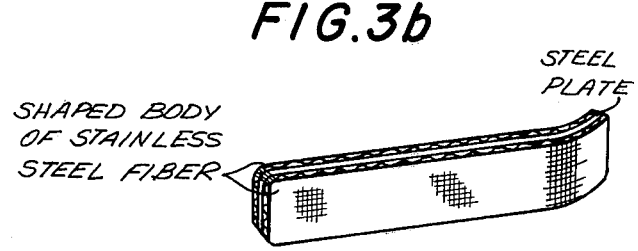
Figure 3C:
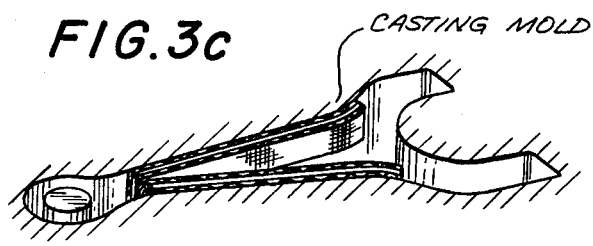
Figure 3D:
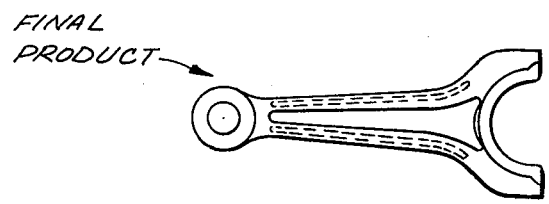

A shaped fiber body in the form of a felt having a bulk density of 0.30 g/cc obtained by using stainless steel fiber of 10 microns in diameter was fixedly secured onto both surfaces of a steel plate of 0.8 mm thickness by spot welding (FIG. 3b) for forming a rod rib portion of a connecting rod in an internal combustion engine. A molten aluminum alloy was filled in and combined with the abovementioned shaped fiber body under the high pressure solidification casting method to produce a connecting rod of light weight with its rod portion reinforced by the steel plate.

When this connecting rod was subjected to a test for its mechanical strength, it was found out that its rigidity in bending and buckling were further augmented.

EXAMPLE 6

MANUFACTURE OF PLAIN BEARING WITH BACK METAL

A steel plate having a thickness of 0.8 mm was press-formed into an arcuate shape, after which it was subjected to a pre-treatment to form a chill member (FIG. 4b). On this pre-treated surface of the arcuate body, there was fixedly secured by seam welding a sintered cloth having a bulk density of 0.15 g/cc and a thickness of 1 mm obtained from stainless steel fiber of 8 microns in diameter (FIG. 4c). Subsequently, the afore-mentioned chill member was placed within a casting mold (FIG. 4e), onto which aluminum alloy ("AC2A" in accordance with the Japanese Industrial Standard) as the matrix was poured and solidified under the high pressure solidification casting method, thereby producing a base material for the bearing. The base material was then annealed, after which it was subjected to broaching process to thereby manufacture the plain bearing (FIG. 4f) having an inner diameter of 40 mm and a thickness of 2 mm.

The thus obtained plain bearing had very rigid adhesion with the back metal, and the lined portion other than the sliding surface was found to have been fiber-reinforced.

This plain bearing was subjected to a test with a dynamic load bearing tester, and it was found to have excellent fatigue-resistance property. Further, with the use of a shaped body of carbon fiber, etc. in combination, the plain bearing exhibited further improved fatigue-resistance, wear-resistance, and seizure-resistance properties.

As stated in detail in the foregoing, since the chill member according to the present invention is rigidly joined to the inorganic fiber shaped body, there can be secured sufficient bonding strength between the two components. This shaped fiber body is then filled and combined with the casting alloy as the matrix under the high pressure solidification casting method, followed by rapid solidification under a maximum hydrostatic high pressure of about 2,000 kg/cm$^2$, whereby the alloy matrix and the internal chill member can be firmly joined together through the fiber-reinforced composite layer, and there is no danger of exfoliation and deformation of the internal chill member from the matrix metal. As the result of this, the internal chill member can be inset at a predetermined part of the matrix metal without the use of mechanical joining means. Further, due to the fiber-reinforced composite layer between the matrix alloy and the chill member, the mechanical strength and rigidity of the chill member can be increased, even if it is of a small thickness. Furthermore, by properly adjusting the quantity of the fiber in the fiber-reinforced composite layer, the thermal expansion between the two metal components can be regulated. In particular, any deformations and exfoliation of the chill member from aluminum alloys and magnesium alloys as the matrix due to difference in the thermal expansion of the chill member can be prevented. Moreover, the mechanical strength in hot condition and rigidity of the matrix metal can be improved by the fiber-reinforced composite layer with the consequence that stable use of the matrix in such hot condition becomes possible.

Thus, the present invention having such various remarkable effects as mentioned in the foregoing is highly efficacious and suitable as the method for insetting the chill member in the cast article.

What is claimed is:

1. A method of casting a molten matrix around a chill member comprising: forming a shaped body of an inorganic fiber material having a bulk density in the range of 0.05 to 1.0 g/cc; fixedly securing said shaped body to the entire surface of a chill member; placing said chill member along with said shaped body in a casting mold; pouring molten matrix material around said chill member in said mold; causing said molten matrix material to penetrate into and combine with said shaped body by high pressure solidification casting to form an intermediate fiber-reinforced composite layer through which said chill member and said matrix material are integrally and closely bonded with each other.

2. The method of claim 1 wherein said chill member is a metal plate.

3. The method of claim 1 wherein said chill member is a shaped metal body.

4. The method of claim 1 wherein said chill member is a ceramic planar body.

5. The method of claim 1 wherein said chill member is a shaped ceramic body.

6. The method of claim 1 wherein said inorganic fiber material is selected from the group consisting of metal fibers, ceramic fibers and mixtures of metal fibers and ceramic fibers.

7. The method of claim 1 wherein said chill member and said shaped body of inorganic fiber material are made of metal and said shaped body of inorganic fiber material is secured to said chill member by spot or seam welding.

8. The method of claim 1 wherein said chill member and said shaped body of inorganic fiber material are made of ceramic material and said shaped body of inorganic fiber material is secured to said chill member by adhesion or fusion-bonding.

9. The method of claim 1 wherein said chill member is plated with molten aluminum prior to securing said shaped body of inorganic fiber material thereto.

10. The method of claim 1 wherein said shaped body of inorganic fiber material is coated with a metal prior to being secured to said chill member.

11. The method of claim 1 wherein said shaped body of inorganic fiber material is coated with a metal prior to being secured to said chill member.

12. A method as claimed in claim 1 wherein said chill member is steel.

13. The method of claim 1 wherein the high pressure solidification casting is effected at a pressure of about 2,000 kg/cm$^2$.

14. The method of claim 13 comprising solidifying said molten matrix material at said high pressure to produce the bonding of said matrix material with said chill member through said fiber body.

* * * * *